(12) United States Patent
Gavrieli et al.

(10) Patent No.: US 8,444,855 B2
(45) Date of Patent: May 21, 2013

(54) METHOD AND DEVICE FOR REMOVING CONTAMINATES FROM FLUID-MATERIAL

(76) Inventors: Jonah Gavrieli, Kiryat Tivon (IL); Pinhas Hascalovich, Haifa (IL)

( * ) Notice: Subject to any disclaimer, the term of this patent is extended or adjusted under 35 U.S.C. 154(b) by 381 days.

(21) Appl. No.: 12/667,803

(22) PCT Filed: Jun. 29, 2008

(86) PCT No.: PCT/IL2008/000888
§ 371 (c)(1),
(2), (4) Date: Jun. 15, 2010

(87) PCT Pub. No.: WO2009/004612
PCT Pub. Date: Jan. 8, 2009

(65) Prior Publication Data
US 2010/0326907 A1 Dec. 30, 2010

(30) Foreign Application Priority Data
Jul. 5, 2007 (IL) .......................... 184441

(51) Int. Cl.
*C02F 3/10* (2006.01)
*B01D 29/70* (2006.01)
*B01D 39/08* (2006.01)

(52) U.S. Cl.
CPC .............. *C02F 3/103* (2013.01); *B01D 29/705* (2013.01); *B01D 39/08* (2013.01)
USPC ........... 210/615; 210/791; 210/150; 210/704; 210/499; 210/505; 66/169 R; 442/1; 442/312

(58) Field of Classification Search
USPC ................. 210/615, 618, 767, 791, 150, 151, 210/407, 470, 484, 485, 489, 499, 503, 505, 210/507, 508; 66/169 R; 442/1, 312
See application file for complete search history.

(56) References Cited

U.S. PATENT DOCUMENTS

| | | | |
|---|---|---|---|
| 3,954,621 A | 5/1976 | Etani et al. | |
| 4,165,281 A * | 8/1979 | Kuriyama et al. | ............ 210/150 |
| 4,427,548 A * | 1/1984 | Quick, Jr. | ....................... 210/150 |
| 4,505,823 A | 3/1985 | Klein | |
| 4,524,139 A * | 6/1985 | Fuchs | ............................ 210/618 |
| 4,708,792 A * | 11/1987 | Takarabe et al. | ............... 210/150 |
| 5,262,051 A | 11/1993 | Iwatsuka | |
| 5,388,316 A | 2/1995 | MacLaren | |

(Continued)

FOREIGN PATENT DOCUMENTS

| | | |
|---|---|---|
| DE | 102004020848 | 3/2006 |
| DE | 102005023150 | 8/2006 |
| EP | 1184499 A1 | 3/2002 |
| WO | WO 2005/021140 | 3/2005 |

OTHER PUBLICATIONS

International Search Report for Application No. PCT/IL2008/000888 mailed Nov. 12, 2008.

(Continued)

*Primary Examiner* — Christopher Upton

(57) ABSTRACT

A method for removing contaminants from a fluid-material comprising: providing at least one substrate comprising a three-dimensional knit in an initial configuration made of knitted polymeric fiber which substantially resumes the initial configuration after it is released from stretching or compressing force; and submerging said at least one substrate in a fluidic material for treatment of the fluidic material.

17 Claims, 10 Drawing Sheets

U.S. PATENT DOCUMENTS

| | | | |
|---|---|---|---|
| 5,389,247 A | 2/1995 | Woodside | |
| 5,430,925 A | 7/1995 | MacLaren | |
| 5,458,779 A | 10/1995 | Odegaard | |
| 6,136,202 A | 10/2000 | Foreman | |
| 6,190,555 B1 | 2/2001 | Kondo | |
| 6,283,309 B1 * | 9/2001 | Koers | 210/615 |
| 6,602,407 B2 * | 8/2003 | Talbot et al. | 210/150 |
| 6,616,845 B2 | 9/2003 | Shechter et al. | |
| 6,726,751 B2 * | 4/2004 | Bause et al. | 210/508 |
| 6,984,596 B2 * | 1/2006 | Dickerson | 66/169 R |
| 7,425,274 B1 * | 9/2008 | Helfet | 210/151 |
| 7,442,295 B2 * | 10/2008 | Cheng et al. | 210/151 |
| 2003/0104192 A1 | 6/2003 | Hester et al. | |
| 2006/0083876 A1 | 4/2006 | Catlin et al. | |
| 2006/0292684 A1 | 12/2006 | Bentley et al. | |

OTHER PUBLICATIONS

Supplementary Search Report issued in EP Application No. 08763644 on Dec. 3, 2010.

* cited by examiner

METHOD AND DEVICE FOR REMOVING CONTAMINATES FROM FLUID-MATERIAL

CROSS-REFERENCE TO RELATED APPLICATIONS

This application is a National Phase Application of PCT International application No. PCT/IL2008/000888, International filing date Jun. 29, 2008, entitled "A METHOD AND DEVICE FOR REMOVING CONTAMINATES FROM FLUID-MATERIAL", published on Jan. 8, 2009 as International Publication No. WO 2009/004612, which claims priority of Israeli Patent Application No. 184441 filed on Jul. 5, 2007 both of which are incorporated herein by reference in their entirety.

FIELD OF THE INVENTION

The present invention relates to a method and a device for removing of contaminants from a fluid-material. More specifically, the present invention deals with a method and a device for removing suspended solid particles (SS particles) and bio-degradable dissolved organic and inorganic substances from a fluid-material.

BACKGROUND OF THE INVENTION

The American Heritage® Dictionary of the English Language, Fourth Edition, defines "fluid" as: "A continuous, amorphous substance whose molecules move freely past one another and that has the tendency to assume the shape of its container; a liquid or gas." The term "fluid-material" in the context of the present invention refers from herein after to a material that supports or at least does not hinder the growth of microorganisms and is in either a liquid state, a gaseous state or in a mixture of liquid state and gaseous states. Examples of fluidic liquids: water and oil. Example of fluidic gasses: free environmental air and water vapor. An example of liquid and gas mixture: well-aerated-water.

"Water" in the context of the present invention refers to potable water, recreation-utilized water such as lake, pool and seawater, to seawater and brackish water used in desalination processes, and to municipal and industrial wastewater. "Water" also referrers to water used for growing sea and fresh water organisms such as algae, fish, clams and crabs in tanks, aquariums and pools.

The term "contaminates" refers from herein after to solid-state particles suspended in a fluid-material as well as to bio-degradable organic and inorganic substances dissolved in a fluid-material. Typically, but in no way limited to, organic substances are proteins, sugars and lipids. Typically, but not limited to, inorganic substances are nitrates and phosphates. In gaseous state materials the previously referred to substances are typically dissolved in water vapor; the vapor being part of the gaseous materials. The suspended solid-state particles are referred to from herein after as: "suspended solid particles" or "SS particles".

For public health, environmental considerations and esthetic reasons contaminants are commonly separated and removed in various domestic and industrial processes and procedures. In some processes it is desired to remove both categories of contaminants: the SS-particles and the dissolved bio-degradable substances. In other cases it is desired to remove only one of the two listed contaminant categories. An example for the removal of both contaminant categories is the treatment of municipal wastewater for environmental disposal or agricultural reuse. Examples for the removal of (only) SS-particles are the pretreatment of seawater prior to desalination by reverse osmosis cartilages and the treatment of emission-gas after industrial coal burning. An example for the removing of (only) bio-degradable dissolved substances is the treatment of water discharged for dairy products production facilities.

The removal of SS-particles from fluids and gases, referred to as "filtering", is done by passing the fluids and/or gases through a porous martial. Of the many porous media used, fabrics are especially common.

The separation ability (the filtering capability or degree) of fabrics depends on their thread density which, in turn, defines the density of pores in a give area. The number of threads per linear inch, defined by the term "mesh", is often used to describe the filtering degree of fabric filters. Another term used to describe the nominal sieving or filtering degree is an actual linear dimension of the shortest straight-line distance (length or width) across an individual opening or pore of the filter medium. This is most often given in microns. The absolute filtration degree is the length of the longest straight-line distance across an individual opening of the filter medium.

When comparing filters the term "open area" is used. The open-area is the pore area or sum of all the areas of all the holes in the filter medium through which the fluid can pass. Filtration open area is expressed as a percentage of the effective filtration area.

In using a porous filter (fabric or other proliferated medium) the "open area" gradually decreases with the accumulation of suspended particles a layer of particles is formed, (referred to as "filtering cake") till the filter is completely blocked. A back-flow (referred to as "backwash") of a liquid or a gas through the filter in the opposite direction of the accumulation of the particles will remove the cake and refresh the filter. Backwashing is effective if the filtered-out particles have not been strongly attached to the filtering medium.

Porous filtering medium, when clean, have enough open area to cause insignificant pressure drops across the medium. However, as suspended SS-particles begin to plug up openings the available open area for the fixed flow rate to pass through decreases, leading to a gradual increase in the stream-through velocity through the medium. Since the pressure drop is proportional to the square of this velocity, the differential pressure across the medium will increase over time as an exponential function. Less open area also means less SS-particles required to increase pressure drop across the medium. The type of weave or knit used to construct a fabric filter can affect the open area greatly. Less open area also means less SS-particles required to increase pressure drop across the fabric element. The type of weave or knit used to construct a fabric filter can affect the open area greatly.

Focus is now turned to the aspect of removal of bio-degradable substances utilizing a porous medium:

When bio-degradable substances dissolved in a microorganisms-supporting-liquid, typically in a water solution, come into contact with a solid surface medium, microorganisms develop over the surfaces of the medium. In a gaseous material, bio-degradable substances can be dissolved in the gaseous vapor or droplets of a microorganisms-supporting-liquid that constitute part the gaseous material. As is the case for liquids, when the bio-degradable dissolved substances in a gas material, typically in water vapor or droplets, come into contact with a solid surface medium, microorganisms develop over the surfaces of the medium. The rate and type of growth depends on the length exposure time as well as on the characteristics and concentration of the dissolved substances, the dissolving material and on many environmental-growth parameters such as the composition of the medium, the temperature, the moisture and the pH. As the microorganisms develop they utilize for their multiplication and biomass-maintenance the dissolved substances—thus removing the substances from the dissolving fluid-material. Biofilm is typically formed by the utilization of dissolved organic substances. The larger the surface area available for the development of microorganisms per volume of a porous medium the more efficient is the removal of the bio-degradable dissolved substances. The growth of the microorganisms is manifested in a mucilaginous protective coating layer in which dead and living bacteria and fungi are encased. As the coating, referred from herein after as "a biofilm", develops and thickens it gradually clogs passages and pores when it develops in a porous medium.

While SS-particles particles typically clog porous filters by forming a cake on the external surface of the receiving-side of a filtering medium, biofilm develops over all the exposed surfaces of the porous filtering medium.

The ability to remove dissolved substances from liquids and vapor by densely growing microorganisms in biofilm is favorably utilized in a wide range of devices. The devices are based on a porous medium having large and dense surface-areas exposed to the passing streams of liquid or gas containing the dissolved substances. With the increase in compaction of pours and passages, the medium becomes more readily clogged by biofilm.

In many cases the passing of either a liquid or a gas material through a porous medium causes both the accumulation of clogging SS-particles and the development of biofilm.

As the SS-particles and biofilm accumulate in the course of time (either simultaneously of separately) the narrow passages through the porous medium clog. Refreshing of the medium is typically done by flushing the medium in the opposite direction of the initial operating direction. The flushing is done with a strong liquid or gaseous stream. The tighter the SS-particles are embedded and biofilm enmeshed on and in a porous medium, more energy and efforts are required for the porous medium refreshing.

In prior art different devices and methods to make backwashing efficient have been disclosed. Examples of such devices are given in U.S. Pat. No. 6,136,202 (Foreman) and WO2005/021140 (Johnson et al. The patents describe techniques of removing the SS particles by applying water jet (Foreman) and air-bubbling (Johnson et al.) forces.

Examples of media sheets with passages between them for growing biofilm for water purification is given in U.S. Pat. No. 5,388,316, U.S. Pat. No. 5,430,925 (MacLaren) and US Patent Application 2003/0104192 (Hester et al.). The use of threads and fibers for growing biofilm is disclosed in U.S. Pat. No. 5,389,247 (Woods), U.S. Pat. No. 5,262,051 (Iwatsuka) and U.S. Pat. No. 6,190,555 (Kondo). Once biofilm has developed and the organic substances removal becomes ineffective the medium has to be refreshed by energetic backwashing or/and physical scraping (accompanied at times by chemical treatments).

Another aspect of purifying liquids, typically wastewater, is the use of loose floating particles with large surface area for biofilm development. In the explanation that follows the use of floating particles is given in reference to wastewater but the use of particles can be made in other microbiological supporting liquids. The floating particles, referred from herein after as "free-drifting particles", are small particles with a density slightly lower than water that are kept suspended in the water by air diffusers or mechanical mixers are described in U.S. Pat. No. 5,458,779 (Odegaard) and are known as the Kaldnes Moving Bed Reactor (KMB) or the NATRIX Technology. A refinement in the use of the KMB technology is described by Shechter et al. in U.S. Pat. No. 6,616,845 in which suspended inert free-drifting particles are used in conjunction with vertical partition elements to control the free movement of the particles. The particles used in both patents are made plastic material having irregular shape with large porosity.

Water purification effectiveness of carrier particles diminishes as biofilm develops and clogs the water passages within the particles. To remedy the clogging the suspended particles have to be periodically treated. Treatment is typically done by gathering the particles and mechanically or chemically removing the biofilm prior to re-use or replacing clogged particles with new ones. Both options are time consuming and expensive.

Typically the structures of both SS-particles removing media (fabric filters and plate-surface filters made of inert materials) and the structure of media for intentionally growing biofilm (such as stacked sheets made of inert materials with spaces between them such as packed threads and fibers) are kept in a fixed state throughout the cycle of accumulation and backwash procedure for the refreshing of the media. The "open-area" and distance between the threads and fibers in the medium maintain the initial ratio throughout the operational life of the media.

Amongst commonly used filtering media, knit fabrics are widely used. An example of such use is given in DE102005023150 (Sabine) which describes a filter sock for removing dirt particles from a fluid comprises a wire-reinforced tube of knitted fabric. An independent claim in the patent includes a filter sock with a filter fabric layer formed by circular knitting and incorporating a reinforcing wire into the filter layer. Another example is DE102004020848 (Hans-Joaachim and Diether) which discloses a filter sock for removing dirt particles from a liquid, having a tubular filter layer of knitted fabric and includes wire reinforcement attached to the filter layer. An independent claim in the patent includes a filter device includes a filter sock located in a hollow profile (specifically a tube) with several radial openings. In both quoted patents the configuration of the knit fabric (the structural configuration between the filaments of the fabric) does not change in the course of using and cleaning of the filtering medium.

It is the aim of the present invention to disclose a method and a device for the removing of contaminants from fluid-materials by a substrate that can be easily and efficiently refreshed by stretching and backwashing when it becomes clogged.

SUMMARY OF THE INVENTION

In accordance with an embodiment of the present invention a method for removing contaminants from a fluid-material is disclosed comprising: providing at least one substrate comprising a three-dimensional knit in an initial configuration made of knitted polymeric fiber which substantially resumes the initial configuration after it is released from stretching or compressing force.

The said at least one substrate is submerged in a fluid-material for treatment of the fluid-material.

Furthermore, the removing of contaminants in accordance with an embodiment of the preset invention comprises retaining contaminants by the substrate while the fluid-material flows through the substrate.

Furthermore, the removing of contaminants in accordance with an embodiment of the preset invention comprises using the substrate as support for biofilm growth for bio-degradation of dissolved substances in the fluid-material.

Furthermore, in accordance with an embodiment of the present invention, the substrate has a dimension which changes substantially more than other orthogonal dimensions of the substrate, when subjected to stretching or compressing forces.

Furthermore, in accordance with an embodiment of the present invention, the method comprises stretching the substrate to release formed biofilm from the substrate.

Furthermore, in accordance with an embodiment of the present invention, the method comprises stretching the substrate to release the retained suspended solid particles from the substrate.

Furthermore, in accordance with an embodiment of the present invention, the substrate comprises polymeric fibers made from material selected from a group of polymer compounds consisting Polyamide, Polyester, Polyurethane, Polyvinyl, Acryl, Polyethylene, Polypropylene, Polycarbonate, PEEK and Polystyrene.

Furthermore, in accordance with an embodiment of the present invention, the substrate comprises mono-filament polymeric fibers.

Furthermore, in accordance with an embodiment of the present invention, the substrate comprises mono-filament fibers and multi-filament fibers.

Furthermore, in accordance with an embodiment of the present invention, the plurality of substrates comprises a plurality of substrates in a stacked formation.

Furthermore, in accordance with an embodiment of the present invention, at least one substrate is placed between two substantially opposite perforated limiters.

Furthermore, in accordance with an embodiment of the present invention, the substrate is made from a bio-degradable material.

Furthermore, in accordance with an embodiment of the present invention, the substrate comprises a plurality of free drifting particles drifting in the treated fluid-material.

In accordance with an embodiment of the present invention a device for treatment of a fluid-material is disclosed comprising at least one substrate comprising a three-dimensional knit in an initial configuration made of knitted polymeric fiber which substantially resumes the initial configuration after it is released from stretching or compressing forces.

Furthermore, the device in accordance with an embodiment of the present invention comprises at least one substrate is placed between two substantially opposite perforated limiters.

Furthermore, the device, in accordance with an embodiment of the present invention, wherein the polymeric fiber is made from material selected from a group of polymer compounds consisting Polyamide, Polyester, Polyurethane, Polyvinyl, Acryl, Polyethylene, Polypropylene, Polycarbonate, PEEK, and Polystyrene.

Furthermore, the device in accordance with an embodiment of the present invention, wherein the plurality of substrates comprises a plurality of substrates in a stacked formation.

Furthermore, the device in accordance with an embodiment of the present invention, wherein the stacked formation is placed in a support frame.

Furthermore, the device in accordance with an embodiment of the present invention wherein the substrate is provided with handles so as to facilitate the stretching of the substrate.

Furthermore, the device in accordance with an embodiment of the present invention, wherein the substrate comprises a plurality of free drifting particles drifting in the treated fluid-material.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 8b is a side-view illustration of the fluid-material treatment device shown in FIG. 8a.

DETAILED DESCRIPTION OF EMBODIMENTS

Figure 1:
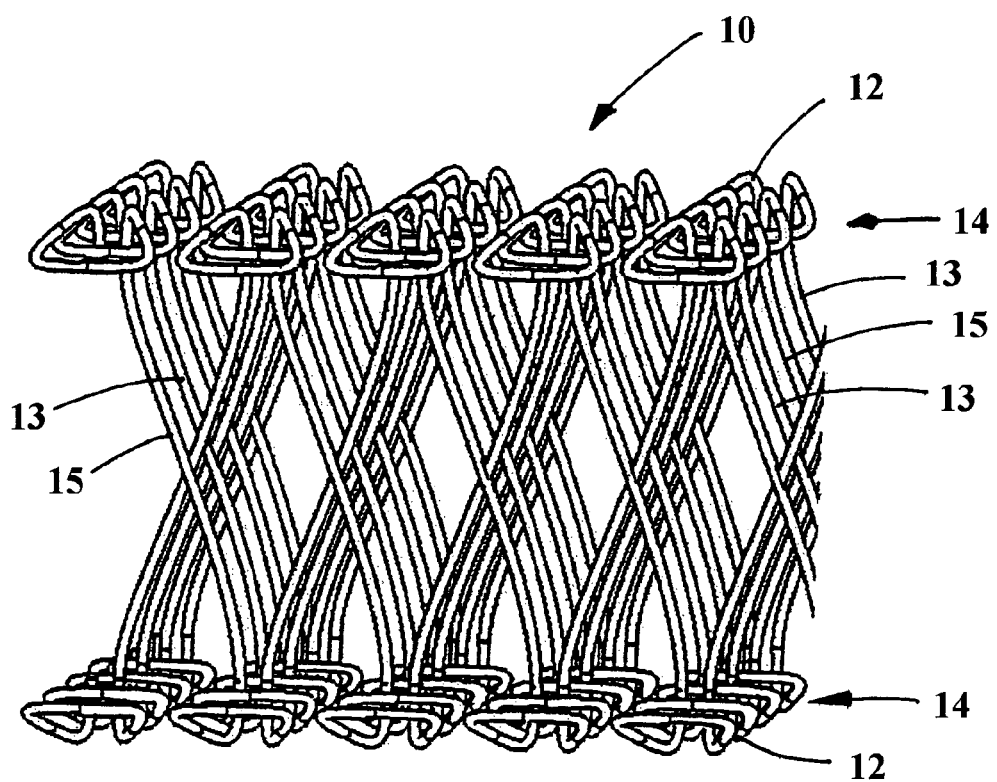
FIG. 1 is a side view isometric illustration of a three-dimensional (3D) knit segment made of mono-filament or multi-filament polymers in accordance with an embodiment of the present invention, in a cramped state.
Figure 1:
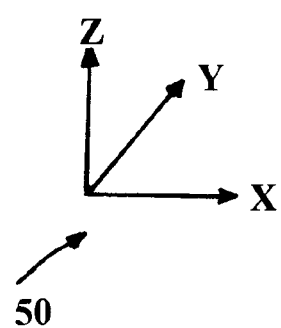

The present invention deals with a method and a device for the removal of contaminants from fluid-materials. In accordance with embodiments of the present invention the removal of the two contaminant components: SS-particles and dissolved bio-degradable substances, is done by utilizing a "stretchable", three dimensional knit fabric (referred to as "3D knit"). The removal can either be done simultaneously or done separately for each of the components. The biodegradation utilizing 3D knits can be done both in aerobic and anaerobic conditions. The terms "Purification" and "treatment" refer from herein after to the process of the removing of the containments from a fluid-material.

Embodiments of the present invention are 3D knits composed of mono-filament polymers. In other embodiments of the present invention 3D knits are composed of both mono-filament and multi-filament polymers.

The 3D knits are structured with two faces of knitted loops having connecting filaments between the two faces and filaments intertwined in the space between the two faces. The close proximity of the looped fibers in the 3D knit in the two faces allows for the streaming of fluid-materials through the knit fabric while filtering and retaining SS-particles. The large surface area of the fibers in 3D knit fabric, composed of the connecting fibers and the fibers of faces, readily enable the development of biofilm supported by dissolved substances in the streaming-through fluid-material.

The 3D knit is constructed with interlock knitted on alternate knitting needles, where the sequence of the knitting needles defines the distance between the faces of the knit (the width of the structure). The 3D knit is elastic, flexible and resilient, so that when it is subjected to crushing forces it may yield and when relieved from these forces it regains its original configuration.

In the context of the present invention, of the three dimensions of the knit the X and Y dimensions indicate the width and length dimensions respectively, "two faces of knitted loops" refers to the two opposite flat-sides of the knit. The Z dimension indicates the thickness of the knit (see 50 in FIG. 1).

The present invention refers to the core of the device disclosed in WO2006/033101 (Hascalovich P. and Tokarsky B.), which described the use of fibers produced from threads of high stiffness for textile cores and sandwich structures. The 3D textile in the mentioned patent application is preferably produced from anisotropic synthetic materials, which have a long range ordering in one preferred direction over other orthogonal directions. Non-limitative examples of fibers made from such materials include crystalline or semi-crystalline nylon 6,6, isotactic polypropylene, and HDPE (High Density Polyethylene), Polyester.

Despite the above, it is not to be construed that the present invention is limited in any way only to the use of anisotropically oriented materials for the fabrication of the 3D knit. Preferable construction materials may also be selected from the following list: Polyamide (e.g., PA 6), Polyester (e.g., PCT, PET, PTT), Polyurethane (e.g., PUR, EL, ED), Polyvinyl (e.g., CLF, PUDF, PVDC, PVAC), Acryl (PAN), Polyethylene, Polypropylene, Polycarbonate, Polystyrene. PEEK Carbon, Basalt and similar materials may also be of use.

In embodiments of the present invention the choice of the mono-filament or multi filament polymers used and the knitting technology of the filaments are such that the produced 3D knit comprises knitted loops that form substantially parallel rows or columns. The "X-dimension" of the knit refers to the orthogonal dimension in which pulling the edges of the knit in opposite directions would result in substantial separation of the rows of loops with respect to one another. The orthogonal direction in which no gaps or only relatively minor gaps are found between the rows of loops upon pulling of the edges is referred to as the "Y-dimension". On stretching the knit in either the X-dimension or Y-dimension the thickness of the knit, referred to as the orthogonal "Z-dimension" diminishes somewhat due to the stretching of the fibers, but the knit remains resilient and regains its original configuration when the pulling forces are stopped. The construction of the knit is demonstrated in FIG. 1 and FIG. 2.

The choice of the type or mode of knitting, typically done by automatic industrial knitting machines, together with the choice of the composition of the filaments, predetermines the compaction of the fibers in the knit, thus the porosity, surface area and the specific weight of the knit can be engineered. The 3D knit comprises a single fiber or a plurality of fibers, depending on the engineering of the 3D knit.

The terms "submerged" from herein after refers to a 3D knit being fully surrounded and covered, partially covered, floating, wetted, and moistened in or by a fluid-material.

When submerged by a fluid-material the high surface area of the filaments per unit volume of the 3D knit serves as an attachment and growing platform for extensive development of biofilm. After its development, upon stretching the 3D knit in the X-dimension, the biofilm looses its grip on and between the filaments and can be removed with ease by backwashing.

The external layer of 3D knits in the X and Y dimensions in a cramped state, comprise proliferated surfaces (both sides of the knit) with an abundance of small pores and narrow passages between the loops and filaments. The small size of the pores and passages bestows physical SS filtering characteristics that depend on the type or mode of knitting and on the choice of filaments used in producing the knit. A fluid-material with SS particles that passes through several layers of a 3D knit, not necessarily all having the same filtering characteristics, undergoes a thorough SS sieve-filtering and removal process. After filtering, upon stretching the 3D fiber layers in the X-dimension, the geometric structure of the pores and passages changes and widens, the SS particles are released from the retaining grip of the knit and can be washed and removed with ease.

The choice of the knitting technique and the chemical composition and width of the filament chosen broadly determines the physical characteristics of the 3D knit: resilience, "stretchability" and "compaction" (the size of the "open-spaces" in the fabric). To substantially broaden the physical limitations of 3D knits made of mono-filament fibers, multi-fiber filaments are knitted amongst and or between the mono-filament fibers. While the mono-filaments bestow the desired flexible and resilient 3 dimensional configuration to the 3D knit fabric, the multi-filament fibers "stretch-out" of the orderly configuration of the mono-filaments and narrow the pores, passages and gaps that run through the 3D fabric.

To illustrate the ability to engineer the characteristics of a 3D knit the following example is given: 40-60 microns size silicate SS particles in a water solution are not retained by a 3D knit fabric made of a 0.4 mm mono-fiber polyamide filament ("Nylon-6") produced by the SiderArc Company, Italy, having 4 knit loops per cm and a width of 1 cm. As the diameter of the filaments in the same knit-construction is reduced below 0.2 mm the "stretchability" characteristics of the fabric diminishes. It becomes negligible in a width below 0.1 mm. The SS-particles retention ability of the 3D fabric does not improve with the reduction in the diameter of the mono-filaments. By intertwining yarn of small diameter 78/68/2 denier polyamide multi-filaments between 0.4 mm mono-fiber knit-loops in a 3D knit with a construction as previously detailed, the SS-particles retaining capacity of the knit of 40-60 micron size particles improves substantially with some or most of the particles retained, depending on the ration between the mono- and multi-filaments used. When the a ratio of 4 to 1 multi- to mono-fibers is constructed about 60% of the SS particles are retained while the 3D knit fabric does not lose its resilience and "stretchability" characteristics. By varying the knitting design, the characteristics of the mono-filaments, the characteristics of the multi-filaments and the ratio multi-/mono-filaments used (if multi-filaments are used at all) a 3D fabric can be tailored-made for SS-particles retention, biofilm development (as a function of the surface area in a given volume of a 3D knit).

Reference is now made to the Figures.

Figure 2:
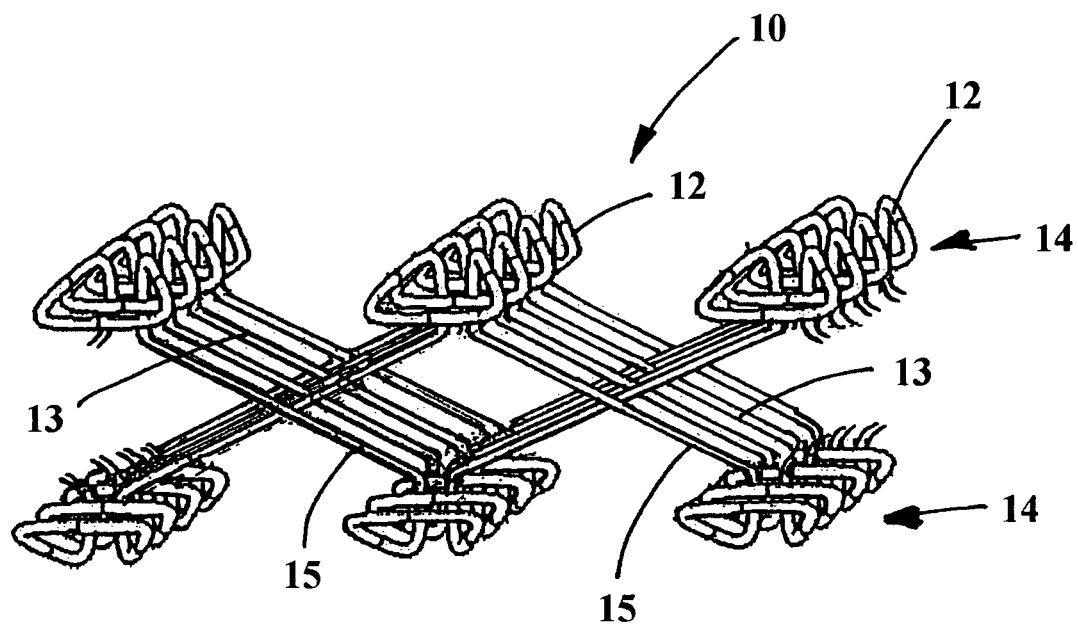
FIG. 2 is a side view illustration of the 3D knit segment shown in FIG. 1 in a stretched state.
Figure 2:
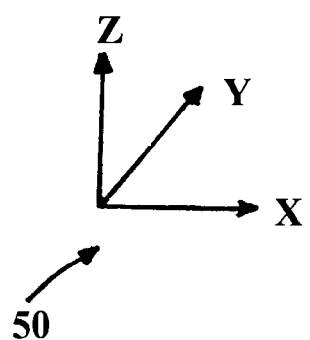
Figure 3:
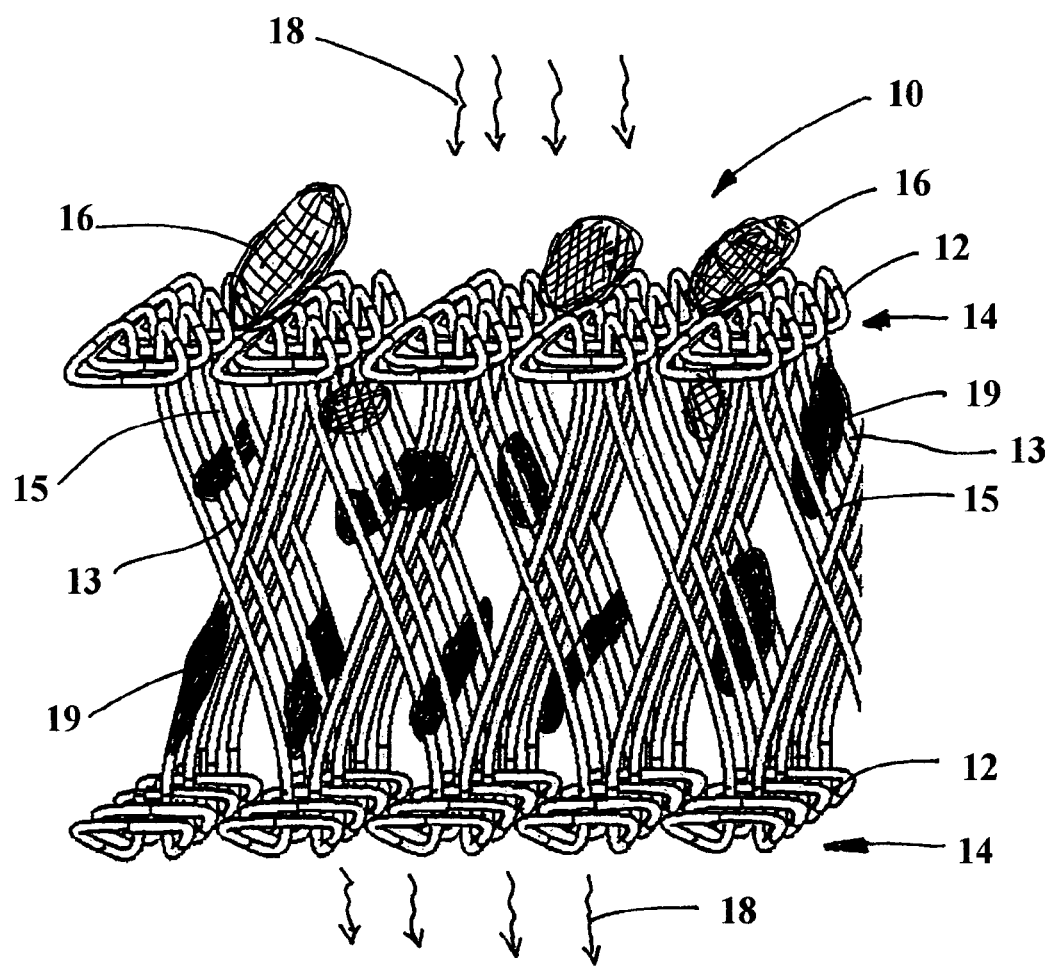
FIG. 3 is a side view isometric illustration of the 3D knit segment shown in FIG. 1 in a cramped state with suspended solid (SS) particles and biofilm patches imbedded on and in the knit matrix.
Figure 4:
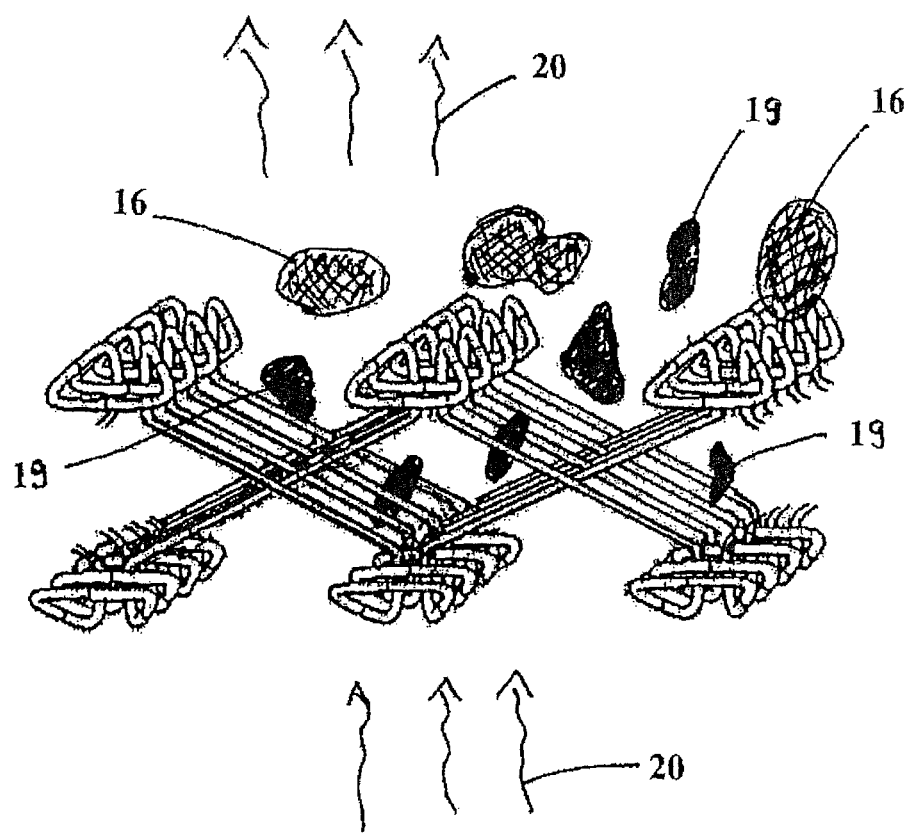
FIG. 4 is a side view isometric illustration of the 3D knit segment in a stretched state with SS-particles and biofilm patch segments released from a clogged 3D knit matrix (shown in FIG. 3), in the process of being refreshed.

FIG. 1 and FIG. 3 are illustrations of cramped 3D knits. FIG. 2 and FIG. 4 are illustrations of stretched 3D knits.

FIG. 1 is an isometric side view illustration of a 3D knit segment 10 made of mono-filament or alternatively, from mono-fiber filament polymers intertwined with multi-filament fibers viewed in a relaxed, cramped configuration. The 3D knit remains and returns to a cramped state when no stretching forces are applied and after stretching forces are applied and relaxed. The knit comprises knitted loops arranged in dense parallel rows or columns 12 forming two flat surfaces or faces 14 with connecting filaments 15 between the faces. Mono-filament fibers are designated 15 and multi-filament fibers are designated 13. A high density of perpendicularly aligned passages and pores run through the faces of the knit allowing for the passage of fluid-material and for the building patches of biofilm on and between the surfaces of the filaments. Suspended solids (SS) particles in the water are caught amongst the fibers (shown in FIG. 3). FIG. 1 can be viewed as a small fragment of a large sheet or pad of 3D knit or can be viewed as a segment of a loose, free floating biofilm supporting particles (as explained in FIG. 11). Coordinate system 50 in the Figure is a directional-diagram indicating the spatial configuration of 3D knit 10, indicating the X, Y and Z dimensions.

FIG. 2 is an isometric side view illustration of a 3D knit segment 10 in a stretched state. The parallel rows or columns 12 forming two faces 14 are shown distanced and separated in the X-dimension with connecting filaments 15 and 13 between the faces 14 stretched and flattened. Element 50 in the Figure is directional-diagram indicating the spatial configuration of 3D knit segment 10.

FIG. 3 is a side view isometric illustration of a 3D knit segment 10 in a cramped state, with SS particles 16 and biofilm patches 19 shown retained on and in the fabric matrix of the knit. Fluid-material 18 is shown approaching and streaming through the breadth dimension of the 3D knit.

FIG. 4 is a schematic an isometric view of a biofilm and SS-particles loaded and clogged 3D knit segment 10 (illustrated in FIG. 3) at the moment of being stretched. On stretching 3D knit 10, SS-particles 16 and biofilm patches 18 disintegrate and are released from the knit. Backwash fluid-material stream 20 removes the SS particles and biofilm patch-particles from the fabric matrix of the knit and refreshes the knit for re-use. On subsiding the forces that stretch 3D knit 10, the knit returns to its cramped (and clean) state (as illustrated in FIG. 1).

Reference is now made to FIG. 5 through FIG. 10.

The Figures illustrate various mechanical-devices utilizing 3D knits fibers as a device for the removal of contaminants from a fluid-material. In the illustrated mechanical-devices 3D knit fabric sheets are used either as sheets with no support frame, referred to as "bare" sheets (FIG. 5, FIG. 6 and FIG. 10) or as sheets encased and supported by a stabilizing supportive frame (FIG. 7, FIG. 8A, FIG. 8B, and FIG. 9).

Figure 5:
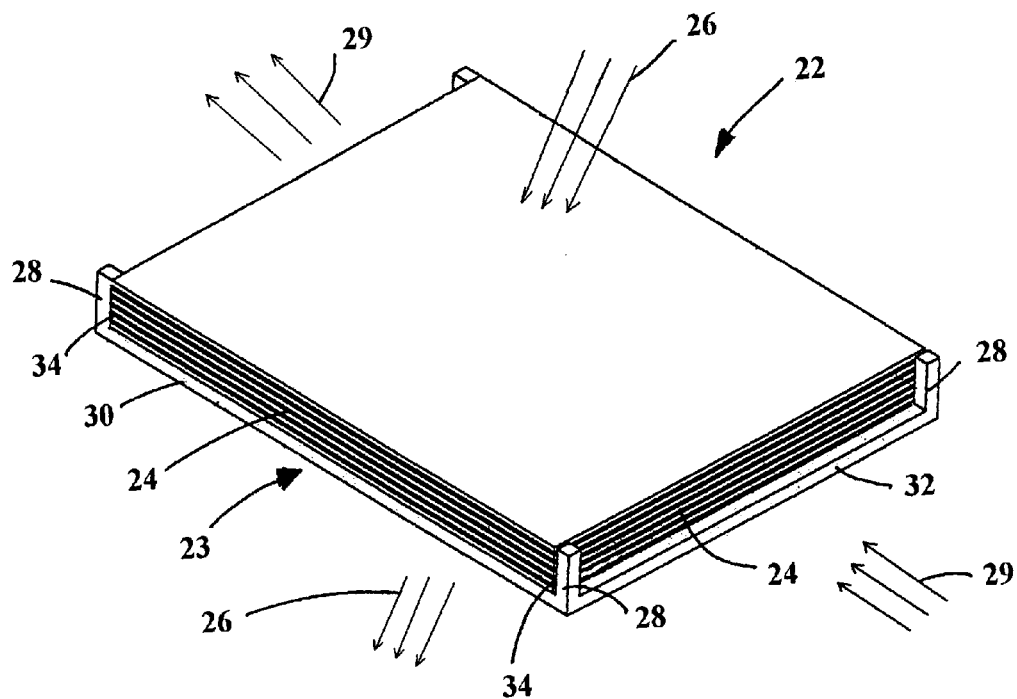
FIG. 5 is an isometric illustration of a fluid-material treatment device in accordance with an embodiment of the present invention, constructed of a plurality of face-to face positioned 3D knit sheets having water passing through the 3D knit sheets.

FIG. 5 is an isometric illustration of a fluid-material treatment device 22, in accordance with an embodiment of the present invention. Treatment device 22 is constructed of an assembly of ("bare") 3D knit sheets 24 positioned in a face-to-face parallel configuration. 3D knit sheets 24 are confined by a frame 23 comprising bars 28, 30, 32 and are either loosely stacked one on top of the other or are individually inserted into tracks or slits 34 that run along on opposite side-walls of frame 23 and secure the sheets in place. A stream of fluid-material, 26 to be treated is shown in the Figure entering the 3D knit sheets 24 from the top of treatment device 22 in a perpendicular or close to a perpendicular angle to the face-surface of upper 3D sheet 24 and exits device 22 from the bottom 3D sheet, having passed through the all the parallel positioned 3D knit sheets.

In yet another embodiment of the present invention, a stream of fluid-material to be treated (designated 26 in FIG. 5) enters the stacked 3D knit sheets from the bottom of treatment device 22 and flows towards the upper surface of the device, in a reverse direction of the stream-path described above.

In another embodiment of the present invention, a stream of fluid-material to-be treated (designated 29 in FIG. 5) enters treatment device 22 in alignment with the parallel layering of the stacked 3D sheets 24 and exits treatment device 22 after having passed in between and through stacked 3D knit sheets 24.

When 3D knit sheets 24 become clogged and the fluid-material (stream 26 or 29) no longer streams freely through, the sheets are removed from device 22 and cleaned for re-use by stretching and simultaneously backwashing, as clarified in FIG. 4.

Figure 6:
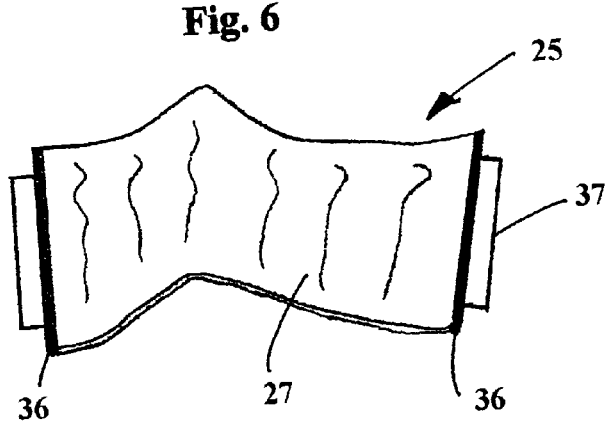
FIG. 6 is an illustration of a fluid-material treatment device comprising 3D knit sheet in accordance with a preferred embodiment of the present invention with handles-for-stretching at two opposite edges of the sheet.

FIG. 6 is a schematic illustration of a fluid-material treatment device 25 constructed of a 3D knit sheet 27 with handles-for-stretching 37 at two opposite edges of the sheet. In accordance with an embodiment of the present invention, in order to simplify and optimize the refreshing for re-use of clogged 3D knit sheets. handles-for-stretching 37 are connected to bars 36 that connected to 3D knit 27 and run all along opposite edges of the 3D knit sheet. Pulling in opposite directions of handles-for-stretching 37 pull bars 36 apart and facilitate the easy and uniform stretching at will of 3D knit 27.

Figure 7:
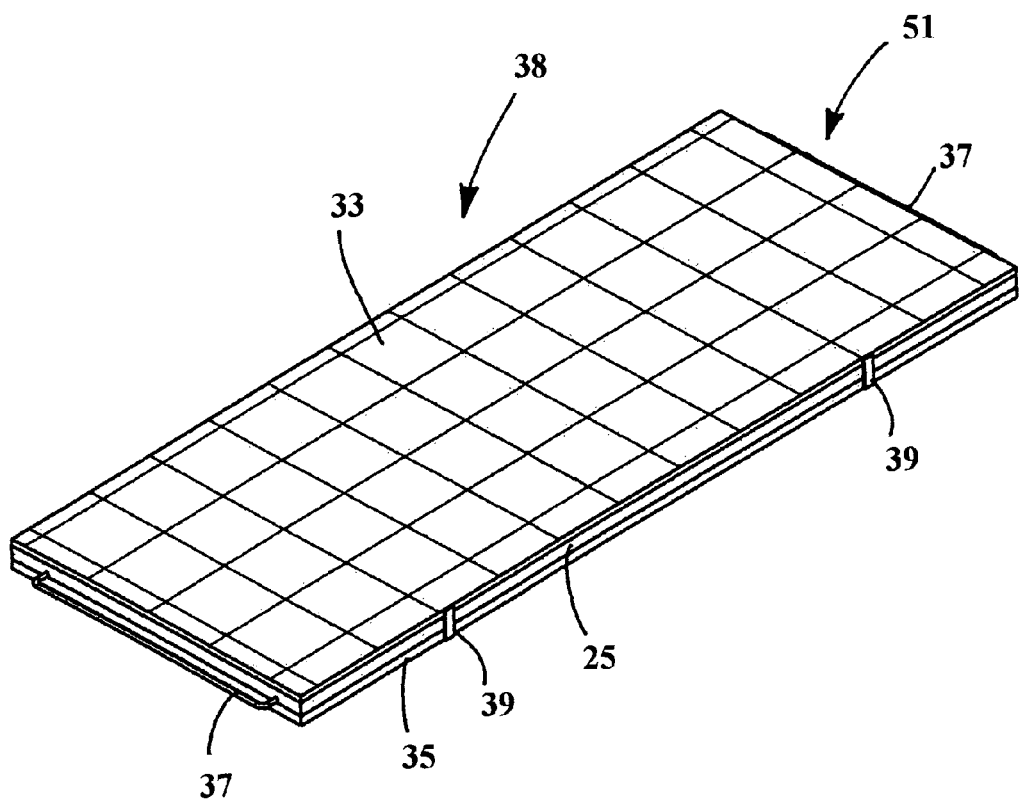
FIG. 7 is an isometric illustration of a fluid-material treatment device constructed of a support-frame (SF) containing a 3D knit sheet, in accordance with an embodiment of the present invention.

FIG. 7 is an isometric illustration of a fluid-material treatment device with a support frame (SF) 51 in accordance with another embodiment of the present invention. Treatment device 51 is constructed of a support-frame (SF) 38 made of two substantially parallel and perforated limiters 33 and 35 with a 3D knit sheet device 25 (shown in FIG. 6) inserted between the two limiters. The perforation of the limiters is made so as not to substantially hinder the passage of the fluid-material into and from the 3D knit sheet 25 inside the SF. The SF can be engineered to support a single and a plurality of 3D knit sheets 25. The limiters, which are substantially rigid, are connected and fixed in position by bars 39 that are place along the two opposite longitudinal edges of the limiters. Shown in the Figure are four bars (two on each side). When large SF are used or other engineering considerations so require, additional bars are included in the structure.

Figure 8A:
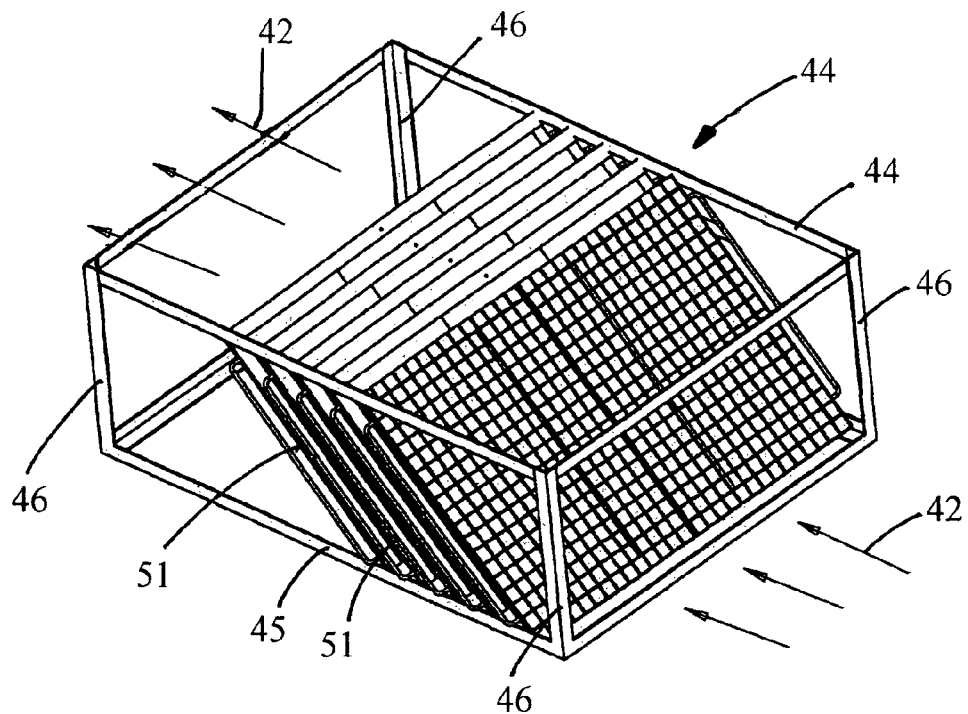
FIG. 8a is an illustration of a fluid-material treatment device constructed of an assembly of tilted support-frame units (a unit of which is shown in FIG. 7), in accordance with an embodiment of the present invention.
Figure 9:
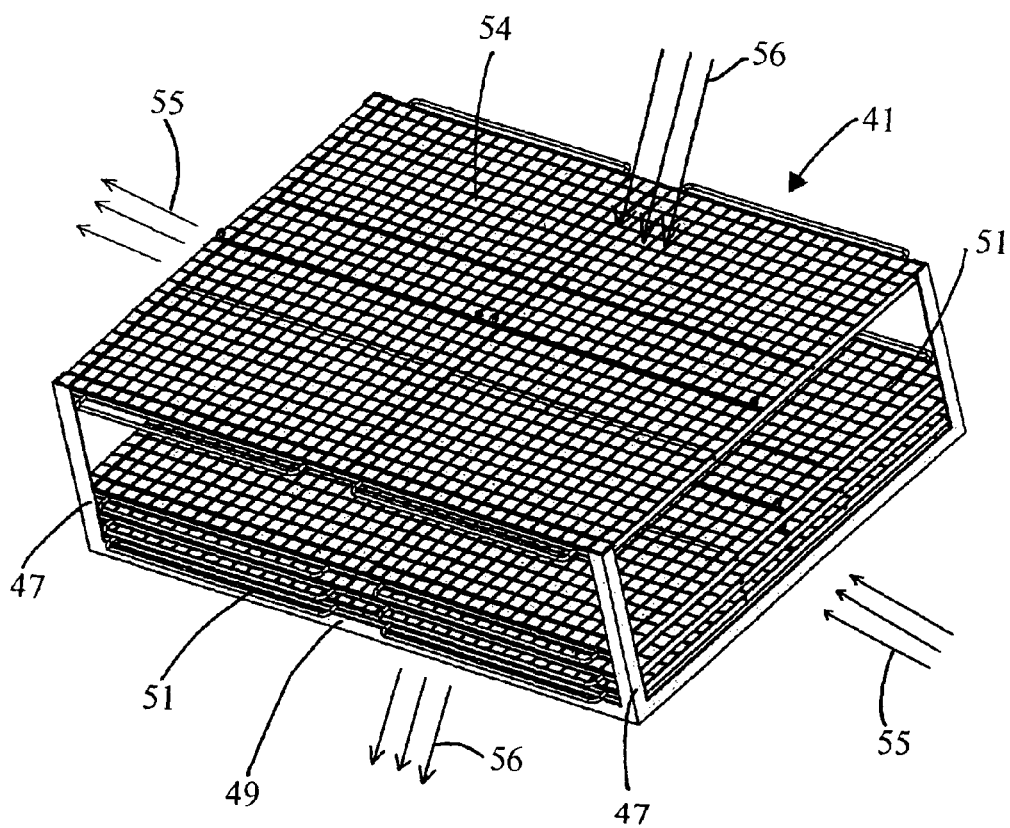
FIG. 9 is an isometric illustration of a fluid-material treatment device in accordance with an embodiment of the present invention, constructed of an assembly of parallel and horizontally positioned support-frame unites (a unit of which is shown in FIG. 7).

FIG. 8A and FIG. 9 illustrate fluid-material treatment devices, utilizing a plurality of parallel positioned SF devices 51 (illustrated in FIG. 7) in accordance with embodiments of the present invention. Depending on engineering calculations and requirements the treatment devices are constructed in various sizes and have a varying number of SF devices. In addition, the devices are constructed so as to be portable or stationary. When a to-be-treated fluid-material passes trough or in a close proximity to the surface of the SFs, biofilm and SS-particles gradually build in and on the 3D knit. When the 3D knit sheets clog, backwash fluid-material is passed through the SFs while the 3D knit sheets are simultaneously stretched. Depending on the construction and usage, the devices are either removed from the fluid-material to be backwash-treated, or backwashing is done by reversing the direction of the current in the fluid-material treatment facility. Electrical motors pulling cables connected to the handles-for-stretching 37 typically do the stretching of the 3D knit sheets in the assemblies.

FIG. 8A is an isometric illustration of a fluid-material treatment device 40, in accordance with a preferred embodiment of the present invention, comprising an assembly of fluid-material treatment SF devices 51 (as shown in FIG. 7) submerged in the fluid-material to-be-treated. Treatment device 40 comprises two horizontal rectangle frame-structures 44 and 45, composed of bars connected in parallel by vertical bars 46 at the four corners of the rectangles. The SF devices 51 are fixed in parallel to each other between the rectangle frame structures in a predetermined slanted angle relative to the surface on which treatment device 40 rests on and perpendicular to the flow direction of the stream of fluid-material 42 that passes through the SF devices 51. Depending on the extent of blockage (clogging) in the SF devices, the intensity of the fluid-material stream and the density of the 3D knit sheets in the SFs some of the fluid-material streams upwards on the surface of the SFs instead of passing through them (designated stream 42a). The two upper corners of the SF devices 51 connect to rectangle frame-structure 44, the lower corners of SF devices 51 connect in a slanted configuration to rectangle frame-structure 45. Depending on engineering considerations the slant-angle of SF devices 51 can determined. FIG. 8A illustrates SF devices 51 positioned at a 45 degree slant. Handles-for-stretching 37 of the SFs 51 protrude from both vertical sides of fluid-material treatment device 40 enabling the stretching of the 3D knit sheets 25 in SFs 51 for cleaning of clogged knits.

Figure 8B:
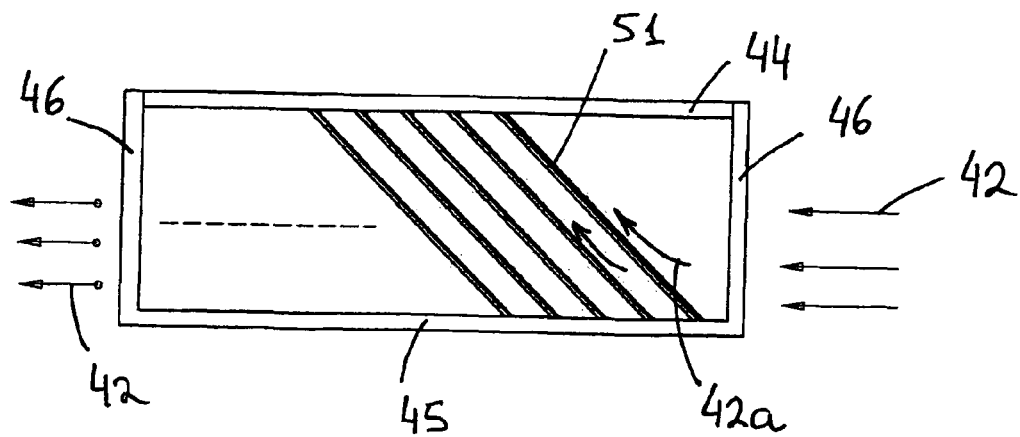

Illustrated in FIG. 8B is a side view of fluid-material treatment device 40 shown in an isometric view in FIG. 8A. Broken-line 48 indicates positions where additional SF devices 51 can be placed in fluid-material treatment device 40.

FIG. 9 is an isometric illustration of a fluid-material treatment device 41 in accordance with another preferred embodiment of the present invention, constructed of an assembly of SF devices 51 fluid-material treatment devices in a horizontal positioned formation fixed in place by a support frame. Fluid-material treatment device 41 is constructed of a horizontal bottom frame structure 49 with four bars 47 extending vertically from the four corners of the structure. SF devices 51 are stacked and fixed in place between the upper SF device, designated 54, and structure 49 at the four corners to vertical bars 47 in parallel and in a horizontal formation relative to frame structure 49. A stream of to-be-treated fluid-material 56 is shown in the Figure entering treatment device 41 from the top of the stack in a substantially perpendicular angle with respect to the upper face-surface and exits treatment device 41 from the bottom of the device, having passed through all of the 3D knit sheets in the SFs.

In yet another embodiment of the present invention, a stream of fluid-material-to-be treated (designated 56 in FIG. 9) enters the SFs 51 from the bottom of fluid-material treatment device 41 and flows towards the upper surface of the device, in a reverse direction of the stream-path previously described.

In another preferred embodiment of the present invention, a stream of to-be-treated fluid-material (designated 55 in FIG. 9) enters fluid-material treatment device 41 in alignment to the parallel positioned SFs 51 and exits device 41 after having passed in between the 3D knit sheets in SF devices 51.

The horizontal orientation of the SF devices 51 minimizes the resistance of treatment device 41 to strong currents 55 that stream through the device. The horizontal orientation diminishes the contact of the matrix of the 3D knit fibers with the passing fluid-material, thus limiting the development of biofilm on the filaments of the 3D knit 25 yet the diminished resistance to the passing fluid-material current insures longer endurance of the submerged structure.

The positioning of SF devices 51, in parallel and in alignment with the incoming fluid-material stream (as shown in 55 in FIG. 9), reduces the resistance of fluid-material treatment device 41 to the current flow of the fluid-material and enables only a diminished SS-particles filtering effect by the SFs. The term "parallel" meaning that the two substantially opposite surfaces of the knit in the SF devices 51 are substantially parallel to the incoming liquid flow.

Positioning SF devices 51 parallel and in a perpendicular configuration to an incoming fluid-material stream (shown in FIG. 9 as stream 56) maximizes the resistance of fluid-material treatment device 41 to the current flow of the fluid-material and enables a thorough SS-particles filtering effect.

Slant-positioning of SF devices in the perpendicular direction of incoming liquid (shown in SF devices 51 in treatment device 40 in FIGS. 8A and 8B) sets a compromise between direct perpendicular and aligned streaming of liquid (as streams 56 and 55 in FIG. 9 through fluid-material treatment device 41)

An example of utilizing fluid-material treatment device 41 illustrated in FIG. 9 is the removal of SS particles from water, typically seawater, in desalination processes. Seawater is pumped from the depth of the sea and flushed onto the upper SF surface 54, through a large number of SF devices 51 (having different 3D knits) and exits the device 41 from the bottom surface (stream designated 56). After the SF devices 51 filtration the seawater enters reverse osmosis cartages (RO) in a desalination plant. In passing through the SF devices 51 the 3D knit retains the particles, preventing their harmful effects on the delicate RO filtration cartages. Periodically, at set time intervals or in accordance to accumulated clogging, the 3D knit sheets in the SF are stretched and a simultaneously a dose seawater that has previously been passed through the stacked bed is briefly injected to backwash and clear the bed. After a brief interruption the 3D knit sheets are relaxed and water treatment device 41 is ready for re-use. The backwashing seawater is returned to the sea with the removed SS particles. SF devices 51 can be stacked in device 41 with or without gaps between the SFs.

Fluid-material treatment device 22 (FIG. 5) illustrates the use of 3D knit sheets 24, without the deployment of support frames. Fluid-material treatment devices 40 and 41 (FIGS. 8A and 9, respectively) utilize SF devices 51 (FIG. 7) for stabilizing 3D knit sheets. The trade-off and choice between the various possible configurations in planning a fluid-material treatment device is a matter of engineering calculations and considerations.

Figure 10:
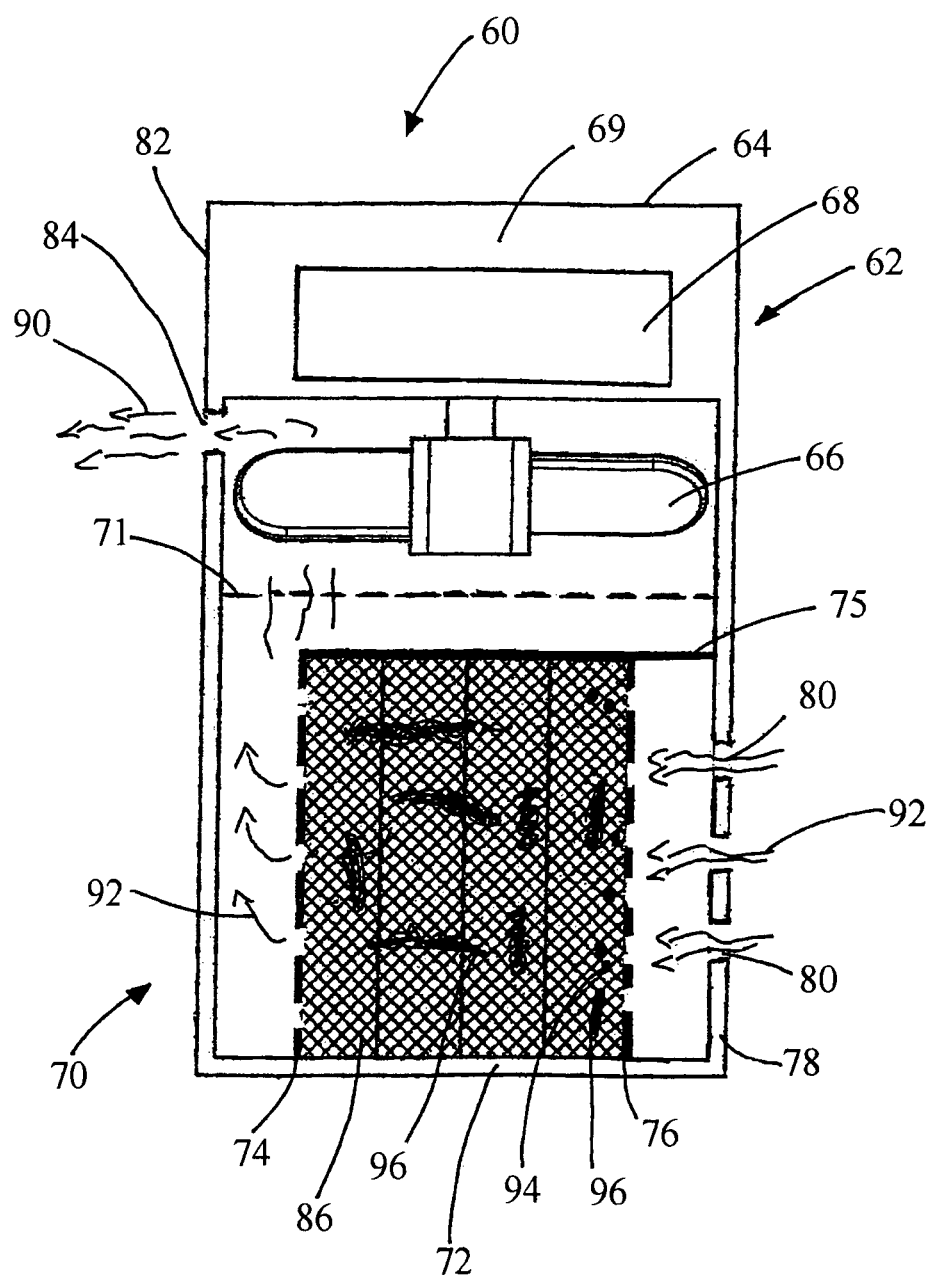
FIG. 10 is a cross-section illustration of a water treatment device in accordance with an embodiment of the present invention, to be typically utilized in home and garden aquariums and ponds.

FIG. 10 is cross-sectional illustration of a water treatment device 60 in accordance with an embodiment the present invention. Water treatment device 60 is typically used for water treatments in domestic and small scale aquariums and ponds. Water treatment device 60 is constructed two box elements made of a rigid material: an upper box element 62 and a lower box element 70. Box element 62 is constructed of an outer shell 64 that encompasses a propeller 66 and an electric motor 68 that drives propeller 66. Lower box element 70 is constructed of an outer shell 72 with two perforated partitioning walls 74 and 76 and a removable solid lid 75 that bridges between the edges of the partitioning wall and reaches all the way to outer wall 78 of box 70. Electrical motor 68 in element 62 is sealed in a water tight box 69. Elements 62 and 70 are joint (along designated line 71 in the Figure) in a manner that makes it possible to disconnect the joint with ease. Pads of 3D knit 86 are stacked together (with no SFs) so as to fill the entire volume of the space defined by wall 74 and 76 and lid 75. Several wide slits run the breadth of wall 78 and enable water to enter from the surrounding to the volume in element 70 defined by encasing 72 lid 75 and perforated wall 76. In element 62, above the rotational plane of propeller 66, on wall 82 (opposite side of wall 78 in element 70) is a slit-opening, designated 84. In turning, propeller 62 drives water towards the bottom of motor box 69 and out through slit 84 (the stream designated 90 in the Figure). The water driven out from slit 84 is replaced by water entering filtering device 60 through slits 80 (the stream designated 92). The water is driven through perforated wall 76, through pads 86, through perforated wall 74 and towards slit 84. The water stream inside filtering device 60 is designated 92. In passing through pads 86 SS-particles 94 are blocked and accumulated in the 3D knit of the pads. If left to operate for considerable length of time (typically, within a week in a warm water aquarium) distinct biofilm agglomerations 96 develop within the matrix of pads 86. When pads 86 are clogged propeller 66 is stopped and filtering device 60 is easily disassembled into two elements, 62 and 70. Pads 86 are removed from element 70 and manually stretched under a current of water to remove the SS-particles and biofilm agglomerates and prepare the pads for re-use. After cleaning, the pads are stacked and returned to element 70. Element 70 is joint to element 62 and filtering device 60 is ready for re-use.

Figure 11:
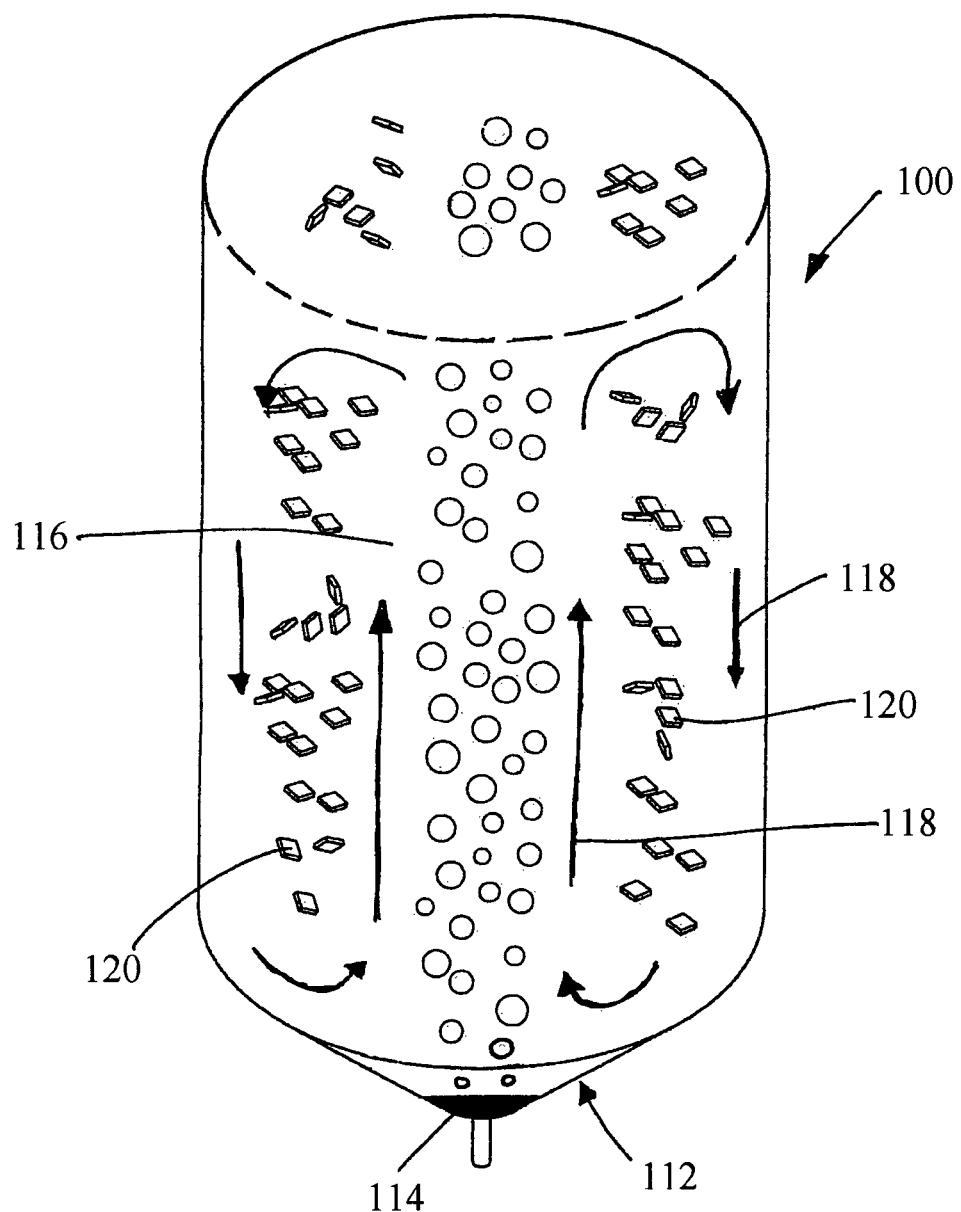
FIG. 11 is an illustration of an air-lift fluids treatment device, typically utilized for water, with free-floating 3D knit sheet-particles or pads, in accordance with a preferred embodiment of the present invention.

Reference is now made to the use of small 3D knit fabric elements as free floating biofilm supporting particles:

FIG. 11 is an illustration of an air-lift liquid treatment device 100 using free-drifting 3D knit pads, referred to from herein after as "platelets" 120, in accordance with an embodiment of the present invention. Liquid treatment device 100 is typically used for the treatment of wastewater—thus reference will be made to wastewater in explaining the structure of device 100. Free-drifting platelets 120 have typical length and berth dimensions of, but not limited to, 4 to 10 millimeters and specific weight close to specific gravity weight of water, being between 0.65 and 0.95. FIG. 11 illustrates a cylinder container 101 having a conical bottom 112 with an air-baffle outlet 114 at the center of the cone. An intense raising air-bubbles column 116, released from air-baffle 114 at the center of container 101, causes an air-lift effect and the circulation of to-be-treated wastewater, designated by arrows 118. Together with the circulating wastewater 3D knit platelets 120 are circulated. In the course of circulation wastewater passes through and over the surfaces of the platelets, enabling the development of biofilm on and in the platelets in the process of biodegradation of organic substances dissolved in the treated wastewater. The platelets have a very high ratio of available biofilm growing surfaces to packing-volume, thus increasing the cost-effect efficiency of operating free-drifting particles water treatment devices. In addition, as the wastewater passes through the platelets SS particles are "caught" and retained by the platelets.

In another preferable embodiment of the 3D knits for fluid-material treatment in accordance with the present invention the 3D knits are produced from bio-degradable fibers such as poly-vinyl alcohol (PVAC) and additives. The bio-degradable fiber filaments are so composed that the bio-degradation takes place at a relatively slow rate (depending on the organic load of the fluid-material and the ambient temperature), enabling intensive surface development of biofilm that leads to efficient fluid-material dissolved compounds degradation. When the 3D knit fiber bio-degrades and crumble the supported biofilm of the filaments is released and dispersed to the surrounding and becomes available organic matter to be degraded by biofilm organisms found on surviving filaments in the fluid-material treatment device. To function efficiently a balance has to be kept between the biodegradation of the biofilm support filaments and the degrading of the fluid-material dissolved compounds.

In another embodiment of the 3D knits for fluid-material treatment in accordance with the present invention bio-degradable 3D knit platelets are used in air-lift liquid treatment devices. The bio-degradation of the platelets is designed to be slow in order to assure that the addition of the bio-degradable matter of the platelets to the concentration of the total organic substances in the to-be-treated liquid is insignificant. The bio-degradation of the platelets eliminates the necessity to "fish" and remove the particles from the liquid and clean them for re-use. New platelets are added to the liquid to compensate for the decay of the "used" and clogged platelets.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method for refreshing a substrate for removing contaminants from a fluid-material, the method comprising:
   providing at least one substrate comprising a three-dimensional knit in an initial configuration made of knitted polymeric fiber which substantially resumes the initial configuration after it is released from stretching or compressing force, the substrate having a dimension which changes substantially more than other orthogonal dimensions of the substrate when subjected to stretching or compressing forces and having been submerged
   in a fluid-material to remove contaminants from the fluid-material; and
   stretching the substrate and concurrently placing the stretched substrate in a fluid stream to remove trapped particles and formed biofilm from the substrate.

2. The method as claimed in claim 1, further comprising retaining the trapped particles by the substrate while the fluid-material flows through the substrate.

3. The method as claimed in claim 1, further comprising using the substrate as support for growth of the biofilm for bio-degradation of dissolved substances in the fluid-material.

4. The method as claimed in claim 1, wherein the substrate comprises polymeric fibers made from a material selected from a group of polymer compounds consisting of Polyamide, Polyester, Polyurethane, Polyvinyl, Acryl, Polyethylene, Polypropylene, Polycarbonate, PEEK and Polystyrene.

5. The method as claimed in claim 1, wherein the substrate comprises monofilament polymeric fibers.

6. The method as claimed in claim 1, wherein the substrate comprises monofilament fibers and multi-filament fibers.

7. The method as claimed in claim 1, wherein said at least one substrate comprises a plurality of substrates in a stacked formation.

8. The method as claimed in claim 1, wherein said at least one substrate is placed between two substantially opposite perforated limiters.

9. The method as claimed in claim 1, wherein the substrate is made from a biodegradable material.

10. The method as claimed in claim 1, wherein the substrate comprises a plurality of free drifting particles drifting in the treated fluid-material.

11. A fluid-material treatment device comprising at least one substrate comprising a three-dimensional knit in an initial configuration made of knitted polymeric fiber, the knit including a plurality of knitted loops arranged in two faces, the loops in each face being arranged in a plurality of substantially parallel rows, each loop in each face being connected by a filament to a loop in the other face, the filaments being intertwined in a space between the two faces, such that the knit is stretchable to increase a distance between the parallel rows of loops, and such that the knit substantially resumes the initial configuration after it is released from stretching forces.

12. The device as claimed in claim 11, wherein said at least one substrate is placed between two substantially opposite perforated limiters.

13. The device as claimed in claim 11, wherein the polymeric fiber is made from material selected from a group of polymer compounds consisting Polyamide, Polyester, Polyurethane, Polyvinyl, Acryl, Polyethylene, Polypropylene, Polycarbonate, PEEK, and Polystyrene.

14. The device as claimed in claim 11, wherein said at least one substrate comprises a plurality of substrates in a stacked formation.

15. The device as claimed in claim 14, wherein the stacked formation is placed in a support frame.

16. The device as claimed in claim 11, wherein the substrate is provided with handles so as to facilitate the stretching of the substrate.

17. The device as claimed in claim 11, wherein the substrate comprises a plurality of free drifting particles drifting in the treated fluid-material.

* * * * *